United States Patent [19]

Armbruster

[11] Patent Number: 4,781,436
[45] Date of Patent: Nov. 1, 1988

[54] ILLUMINATED FEATHER-TOUCH SOLENOID ACTUATED VEHICLE DAY/NIGHT MIRROR

[76] Inventor: Joseph M. Armbruster, 2700 NE. 47th St., Lighthouse Point, Fla. 33064

[21] Appl. No.: 839,573

[22] Filed: Mar. 14, 1986

[51] Int. Cl.$^4$ .................... G02B 7/18; G02B 17/00
[52] U.S. Cl. .................................................. 350/281
[58] Field of Search ............... 350/281, 279, 452, 612; D12/187

[56] References Cited

U.S. PATENT DOCUMENTS 3,026,771 3/1962 Knowlton et al. .................. 350/281
3,625,597 12/1971 Jones ................................... 350/281

*Primary Examiner*—John K. Corbin
*Assistant Examiner*—Rebecca D. Gass
*Attorney, Agent, or Firm*—Fleit, Jacobson, Cohn & Price

[57] ABSTRACT

A rear view mirror mounted either interiorly or exteriorly of a vehicle which incorporates a unique structure providing an illuminated, feather-touch, bar switch for actuating a solenoid to change the mirror from day-to-night and night-to-day positions by utilizing a single finger, feather-touch operation. The mirror also includes a map light or lights located along the lower edge thereof with the map light or lights being actuated by a feather touch switch or switches and icluding a downwardly facing fresnel lens to direct a light beam for easy map reading and a shield or baffle to prevent light rays from entering the eyes of the vehicle operator. A mechanical memory switch and push/pull solenoid may be utilized as an alternative to magnetically latched solenoid and circuitry therewith.

8 Claims, 2 Drawing Sheets

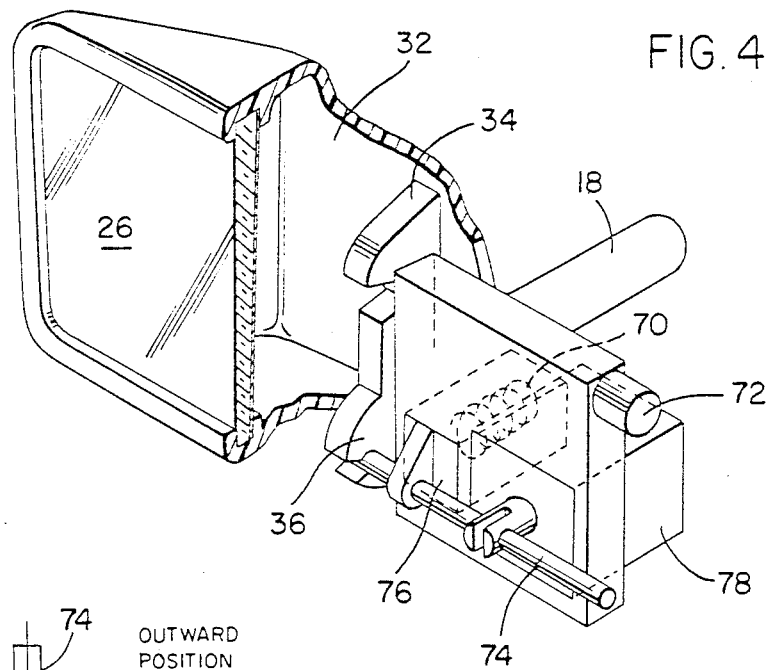
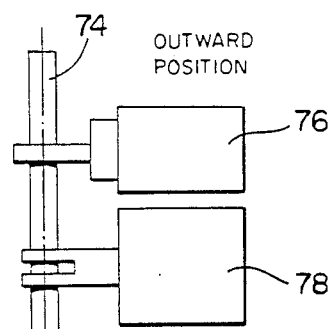
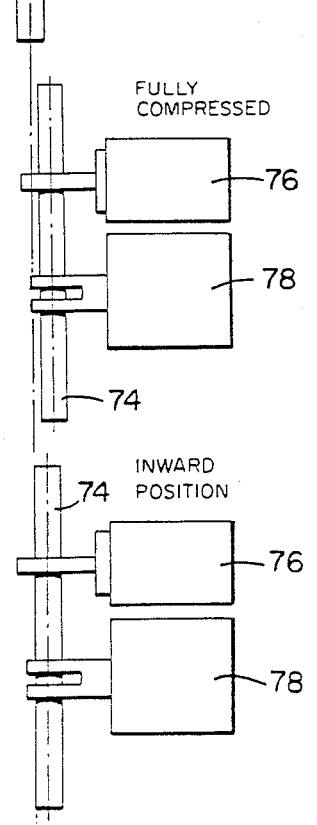
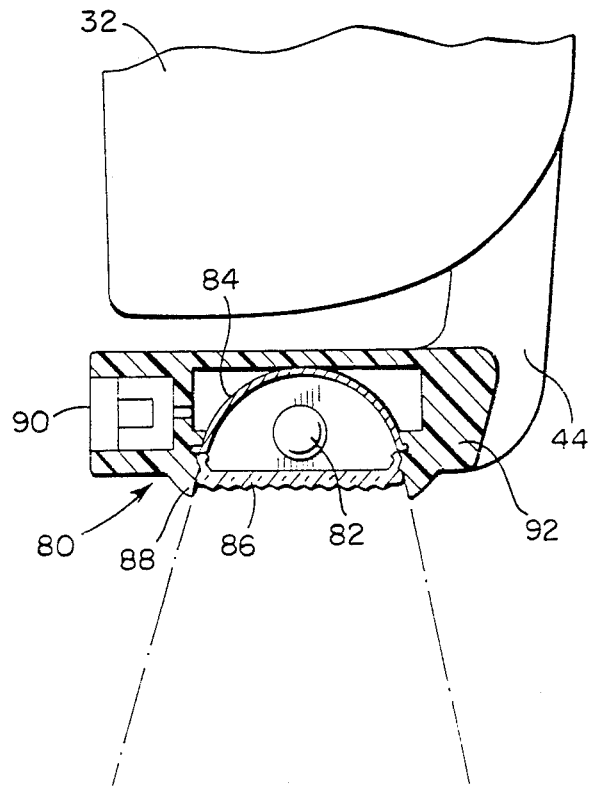

ILLUMINATED FEATHER-TOUCH SOLENOID ACTUATED VEHICLE DAY/NIGHT MIRROR

BACKGROUND OF THE INVENTION

1. Field of the Invention

The present invention generally relates to a rear view mirror mounted either interiorly or exteriorly of a vehicle which incorporates a unique structure providing an illuminated, feather-touch, bar switch for actuating a solenoid to change the mirror from day-to-night and night-to-day positions by utilizing a single finger, feather-touch operation.

2. Information Disclosure Statement

Conventional vehicle mounted rear view mirrors incorporate a manually operated, resiliently biased lever mechanism to enable selection of either the day or night mode. One of the problems which exists with respect to existing manual systems is the very definite potential of moving the entire mirror out of its preset viewing position when exerting sufficient force necessary to actuate the lever mechanism. When this occurs, it then becomes necessary to readjust the mirror to regain proper viewing thus further distracting the vehicle operator. Also, the physical characteristics and the force necessary to actuate conventional type mirror lever mechanisms varies considerably from one manufacturer to another thereby creating an additional hazard when a vehicle operator is in a vehicle with which he is not familiar.

In addition to the conventional manually actuated rear view mirrors, devices to automatically change the rear view mirror from day mode to night mode have been developed and have been used on certain vehicles. However, such devices are quite elaborate and frequently shift unexpectedly from one mode to another which can be quite distracting to a vehicle operator. Also, such devices are frequently subject to ambient light conditions that automatically change the mirror from one mode to another when such change is undesired and in some instances will not change the mode when a change is desirable.

SUMMARY OF THE INVENTION

An object of the present invention is to provide a rear view mirror incorporating a feather-touch switch assembly, a solenoid and required electronic circuitry all enclosed in the mirror housing to enable a driver to instantly select the mode in which the mirror is positioned and enabling the interior rear view mirror to be instantly changed from the day-to-night positions and vice versa with just a feather touch, one finger operation thereby eliminating the possibility of moving the entire mirror out of its preset viewing position.

Another object of the invention is to provide a rear view mirror in accordance with the preceding object in which the solenoid is extremely fast in acting to move the mirror from one position to another thereby eliminating possible hazardous glare from the mirror's reflective surface into the driver's eyes thereby enhancing the safe operation of the vehicle.

A further object of the invention is to provide a rear view mirror in accordance with the preceding objects in which the feather-touch bar switch is illuminated with virtually no energy or force being required to actuate the device thereby eliminating the possibility of disturbing the preset position of the mirror with the illuminated bar switch also having an appropriate inscription such as "mirror" or "day/night" thereby enabling the driver to instantly identify and actuate the switch thereby greatly decreasing distractions.

Still another object of the invention is to provide a rear view mirror in accordance with the preceding objects in which the solenoid achieves the necessary approximate 3° angle of shift of the mirror when changing from the day position to the night position with the solenoid being a travel restricted, spring loaded, magnetically latching solenoid which eliminates the need for necessarily tight tolerances on the mirror construction with a bracket being attached to the solenoid for restricting the movement of the solenoid plunger to the desired travel distance or actuated by a push/pull solenoid and mechanical memory switch.

A still further object of the invention is to provide a rear view mirror having a map light incorporated therein which is dependable in operation, easily installed in new and existing vehicles and relatively inexpensive to manufacture, install and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a fragmental perspective view of an alternate embodiment of the invention.

FIG. 5 is a group schematic illustration of the switch and solenoid arrangement of FIG. 4.

FIG. 6 is a sectional view illustrating the map light structure in the mirror.

DESCRIPTION OF THE PREFERRED EMBODIMENT

Figure 1:
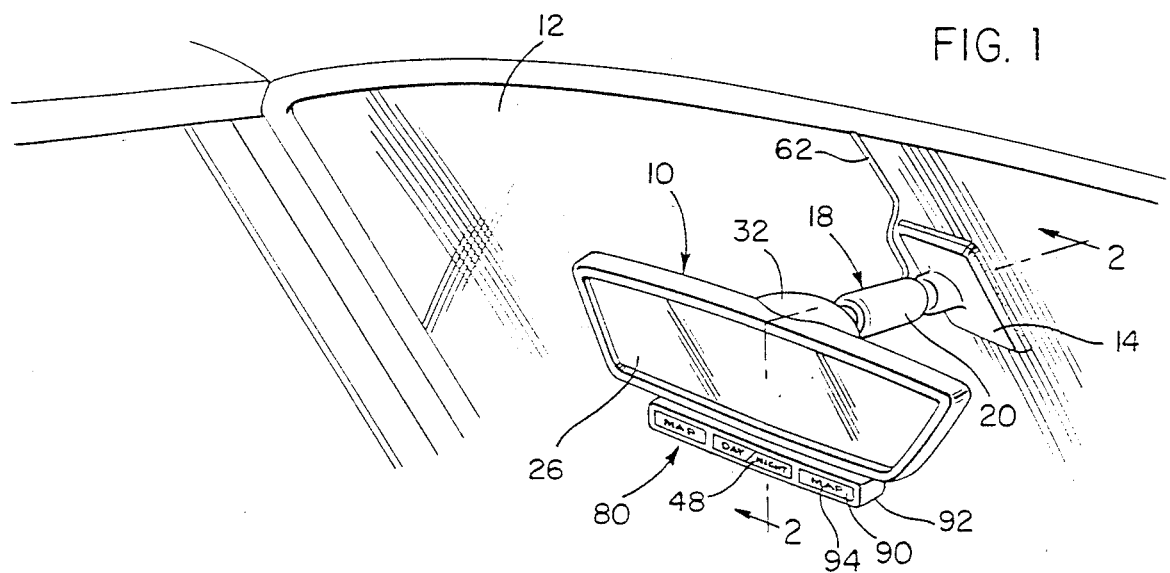
FIG. 1 is a perspective view of an interior rear view mirror constructed in accordance with the present invention.

Referring now specifically to the drawings, the rear view mirror of the present invention is generally designated by reference numeral 10 and is illustrated in a typical installation interiorly of a vehicle and is mounted as is customary from the windshield 12 by a bracket structure 14 secured to the windshield by suitable bonding material, adhesive or the like 16 in a conventional manner. An adjustable bracket assembly generally designated by the numeral 18 is connected to the windshield bracket 14 with the adjustable bracket assembly 18 including a connector 20 which may be tubular in configuration and provided with a ball joint 22 and 24 at each end thereof for enabling univeral adjustment of a mirror 26 to optimum position for proper rear viewing by the vehicle operator. This construction is conventional and forms no particular part of the present invention except in its association with the components of this invention which enables the present invention to be effectively employed with conventional mounting structure presently used to secure rear view mirrors to the windshield or other area of a vehicle.

Figure 2:
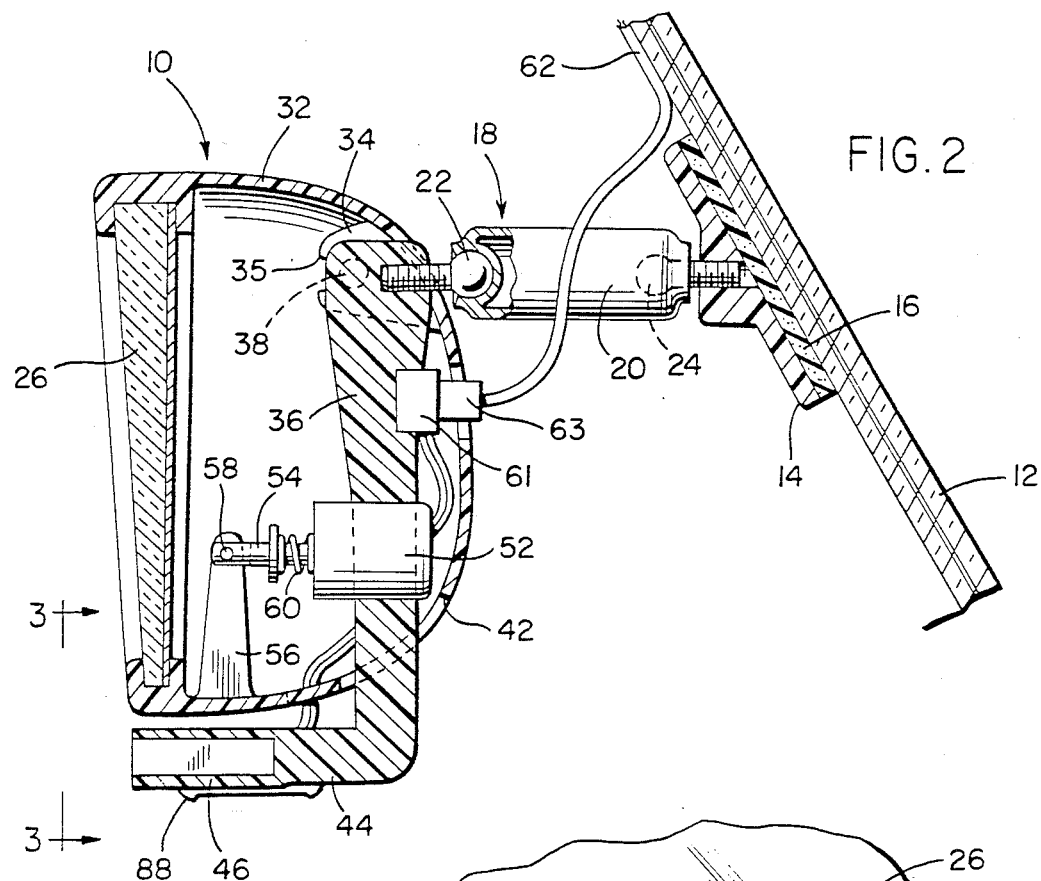
FIG. 2 is a vertical sectional view, on an enlarged scale, taken substantially upon a plane passing along section line 2—2 on FIG. 1 illustrating further structural details of the rear view mirror.

As illustrated in FIG. 2, the mirror 26 is preferably supported in a hollow housing 32. The hollow housing 32 includes a bracket 34 pivotally attached to a support frame 36 by a transverse pivot pin 38 snapped into slots 35 in bracket 34 which enables pivotal movement of the mirror 26 about the pivot axis defined by pivot pin 38 to pivot the mirror a required 3° to position it in a day mode or a night mode. The support frame 36 includes the ball joint 22 molded into support frame 36 for connecting the support frame 36 to the adjustable bracket assembly 18 with the support frame 36 extending downwardly in the housing 32, through an opening 42 in the bottom thereof and then forwardly as at 44 terminating in a switch housing 46 which includes a feather-touch bar switch having an activation plate 48 provided with indicia 50 oriented generally along the front bottom edge at the center of the mirror 26 as illustrated in the drawings.

Supported from the support frame 36 below the pivot pin 38 is a solenoid 52 having a reciprocating plunger 54 connected to a bracket 56 on the housing 32 by snapped in pivot pin 58. The plunger 54 includes a coil spring 60 and electrical wiring 62 extends from the switch housing 46 and solenoid 52 to a connector 61 fastened to the support frame 36 for connection with a connector 63 connected with wiring 62 for connection with the electrical system of the vehicle in a conventional manner. The switch housing 46 is illuminated so that the indicia 50 is readily observable and virtually no energy or force is required to be applied to the activation plate 48 thereby rendering it virtually impossible to disturb the preset position of the mirror when changing the mirror from a day mode to a night mode. This also enables the driver to instantly identify the switch and quickly and easily alter the mode of the mirror with very little distraction from operation of the vehicle. The solenoid is a spring loaded travel restricted solenoid in which the mirror is retained in either the day or night position and not at a position between these positions by the spring loaded, magnetically latched solenoid in which a spring continually exerts a force on the plunger to hold it in the extended position. When the solenoid is activated, it overcomes the force of the spring and the plunger is pulled inwardly until contacting a magnet. Upon contact with the magnet, the solenoid is deactivated but the plunger remains in this contact position since the magnetic attraction is greatly increased by the physical contact. Once the contact is broken, the spring will overcome the magnet's greatly reduced force pushing the plunger back to the outward position. In order to release the plunger from the magnet's contact, a reversed voltage is introduced into the solenoid which neutralizes the magnet's field thus allowing the plunger to be forced outward by the spring. Thus, there is no inbetween position of the plunger since the plunger is either in contact with the magnet or held outwardly by the spring. Reversal of the voltage is accomplished by a logic circuit that reverses the polarity at alternate touches of the switch so that the solenoid is activated only for a short time when the switch is closed. The specific construction of the switch, logic circuit and solenoid provides a compact package with the feather-touch switch and solenoid adding very little to the overall size of the mirror and the wire loom or harness can be easily associated with the electrical system of the vehicle. This construction is relatively inexpensive and dependable which enables it to be economically incorporated into new vehicles or added onto existing vehicles.

Another method of actuating the day/night modes of the mirror is shown in FIGS. 4 and 5 which includes a mechanical memory switch 76. The use of this type switch eliminates the need for a travel-restricted, spring-loaded, magnetically latched solenoid and complex circuitry and enables the use of a conventional push/pull solenoid. The mechanical memory switch includes two memory positions, the outward position and the inward position as illustrated in FIG. 5. When the switch is in the outward position, it is totally extended. A spring 70 provides a force to hold the switch 76 in the outward position. By overcoming the force of the spring 70, the switch 76 is pushed in past the inward position until it is fully compressed. Then, when pressure is released, the spring pushes the switch outward. However, by a mechanical restriction internally of the switch, the travel is restricted to a distance less than the initial or outward position. This new position then becomes the inward position. The next time the switch is depressed and released, the switch will return to the outward position and with each subsequent push and release of the switch, it will alternate memory positions. This type of switch in and of itself is a known concept.

FIG. 4 illustrates the manner in which the switch 76 is interlocked mechanically to the hollow housing 32 so that in assembly, the hollow housing is dependent on the location of the switch. The location of the mechanical interlock is not coincident with the pivot axis. The solenoid will be coupled to the switch 76 in such a fashion that when the solenoid is activated, the switch's position will relocate to the fully compressed position so that when the solenoid is deenergized, the switch 76 will assume the opposite position it prvviously occupied. As further illustrated in FIG. 4, brackets 34 and 36 are part of the hollow housing 32 and mounting boss 72 snaps into bracket 34 and the connecting device 74 snaps into bracket 36 with the connecting device 74 connecting the solenoid 78 and the mechanical memory switch 76 to the hollow housing 32. As illustrated, the coil spring 70 is contained within the switch 76. If desired, the switch 76 can be integrated into the solenoid thereby eliminating the necessity for a separately packaged switch.

Figure 3:
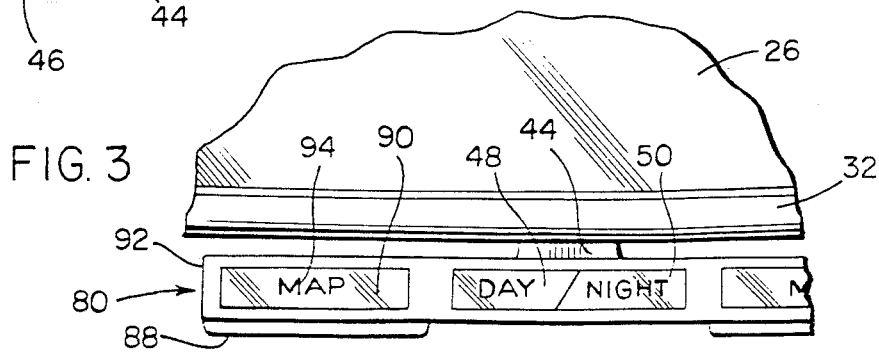
FIG. 3 is a fragmental elevational view taken along reference line 3—3 on FIG. 2 illustrating the specific construction of the illuminated feather-touch switch.

The arrangements illustrated in FIGS. 4 and 5 eliminates some of the componentry necessary in the embodiment of the invention illustrated in FIGS. 1-3 by providing a simplified version that will be somewhat less in cost. Both methods of activation can serve to adjust the exterior mirrors in the same manner as the interior mirror, that is, actuating the switch on the interior mirror may simultaneously change the day/night position of either or both exterior mirrors as well as the interior mirror.

FIG. 6 illustrates the structural arrangement of the interior mirror in which a map light 80 is provided on either or both sides of the switch housing 46 along the bottom of the mirror with the light 80 including a light bulb 82, a reflector 84 oriented above the light bulb and a fresnel lens 86 located below the light bulb to direct the light beam downwardly with a baffle 88 being provided at the forward edge of the reflector to prevent light from shining into the eyes of the driver or passenger of the vehicle. A feather touch switch 90 is located in the forward surface of the housing 32 which supports the light 80 with indicia 94 thereon indicating that this is a map light. This light provides effective illumination for map reading and for other purposes in which the driver or front seat passenger requires a light. This is especially useful in conjunction with convertible-type automobiles and solves the problem of the absence of overhead lighting for map reading or the like in this type of automobile and provides a convenient and effective location for a map reading light. This structure provides a safety feature by providing a light whose absence could otherwise cause a hazardous condition. The shield or baffle located outwardly of the bulb keeps the light from shining in the eyes of the driver or front seat passenger with the fresnel lens and baffle providing excellent illumination for map viewing, reading and the like. As illustrated, two illuminated feather touch map light switches 90 are shown which are contained in or connected with the mirror housing. However, a single map light switch may be utilized with two lights or only one map light may be used if desired. Additionally, the map light switches can be located remotely from the mirror if desired such as on the dashboard, center console or steering wheel. Electrical energy may be supplied to the mirror and map light through a wire loom 62 connected to the electrical circuit of the vehicle in any suitable manner depending upon the manufacturer's requirement with the wire loom being provided with a plug on the end thereof if desired with the plug being received in a suitable receptacle built into the back of the mirror as illustrated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A rear view mirror for vehicles comprising a reflective mirror, means mounting the mirror in position for observation by a vehicle operator to enable areas rearwardly of the vehicle to be observed, said mounting means including means pivoting the mirror about a transverse axis generally perpendicular to the longitudinal axis of a vehicle in order to move the mirror from a day mode to a night mode so that vehicles approaching from the rear with illuminated headlights will not blind or distract the operator of the vehicle and means responsive to feather touch of a finger of a vehicle operator to pivot the mirror between day and night positions, said means for moving the mirror about a transverse axis including a solenoid, a feather-touch switch means electrically associated with the solenoid and the electrical system of a vehicle to actuate the solenoid to move the mirror upon application of one finger of the vehicle operator to the switch means.

2. The rear view mirror as defined in claim 1 wherein said solenoid includes a push/pull solenoid, said switch means comprising a mechanical memory switch electrically associated with the solenoid and the electrical system of a veicle to actuate the solenoid to move the mirror between day and night positions upon depression of an actuating member for said switch.

3. The rear view mirror as defined in claim 1 wherein said mirror includes a housing engaging the periphery thereof and enclosing the solenoid, said switch means including an illuminated switch bar in the form of an imperforate plate having indicia thereon indicating day and night positions for the mirror.

4. The rear view mirror as defined in claim 3 wherein said switch means is located centrally of the bottom of the mirror for optimum access thereto.

5. The rear view mirror as defined in claim 4 wherein said mounting means includes an adjustable bracket assembly supporting the mirror and housing adjustably from vehicular structure to position the mirror in desired position with the feather touch switch means enabling the mirror to be changed between day and night positions without exerting force sufficient to move the bracket and housing from preset position with respect to the particular structure.

6. A rear view mirror for vehicles comprising a reflective mirror, means mounting the mirror in position for observation by a vehicle operator to enable areas rearwardly of the vehicle to be observed, said mounting means including means pivoting the mirror about a transverse axis generally perpendicular to the longitudinal axis of a vehicle in order to move the mirror from a day mode to a night mode so that vehicles approaching from the rear with illuminated headlights will not blind or distract the operator of the vehicle and means responsive to feather touch of a finger of a vehicle operator to pivot the mirror between day and night positions, and illumination means located along the lower portion of the mirror mounting means and including means directing a light beam downwardly in relation to the rear view mirror for reading a map or for other illumination purposes, and switch means responsive to feather touch of a finger of a vehicle operator to actuate the illumination means.

7. The rear view mirror as defined in claim 6 wherein said illuminating means includes a reflector oriented above the light means, a Fresnel lens below the light means to direct the light beam emitted therefrom, and a shield located along the edge of the reflector and lens to prevent light rays from entering the eyes of the vehicle operator when the light means is illuminated.

8. A rear view mirror for vehicles comprising a reflective mirror, means mounting the mirror in adjustaable preset position for observation by a vehicle operator to enable areas rearwardly of the vehicle to be observed, said mounting means including means pivoting the mirror in order to pivot the mirror from a day mode to a night mode so that vehicles approaching from the rear with illuminated headlights will not blind or distract the opearator of the vehicle, said means pivoting the mirror including a solenoid, switch means electrically associated with the solenoid and the electrical system of a vehicle to actuate the solenoid to pivot the mirror upon contact of the vehicle operator's finger with the switch means, said switch means being actuated by force insufficient to disturb the adjustable preset position of the mirror when pivoting it between night mode and day mode, illumination means located along the lower portion of the mirror mounting means and including means directing a light beam downwardly in relation to the rear view mirror for reading a map or for other illumination purposes, and switch means responsive to feather touch of a finger of a vehicle operator to actuate the illumination means.

* * * * *